United States Patent [19]

Daugherty

[11] Patent Number: 4,603,620
[45] Date of Patent: Aug. 5, 1986

[54] VPS WITH HOT WATER DISPENSER

[75] Inventor: Donald L. Daugherty, Springfield, Ill.

[73] Assignee: Bunn-O-Matic Corporation, Springfield, Ill.

[21] Appl. No.: 697,259

[22] Filed: Feb. 1, 1985

[51] Int. Cl.[4] .......................... A47J 31/24; A47J 31/40
[52] U.S. Cl. ........................................ 99/300; 99/284; 99/290
[58] Field of Search ................. 99/279, 290, 284, 288, 99/295, 299, 300, 304, 307, 316; 426/433; 126/344, 380

[56] References Cited

U.S. PATENT DOCUMENTS

| | | | |
|---|---|---|---|
| 3,126,812 | 3/1964 | Nau | 99/290 |
| 3,336,856 | 8/1967 | Martin | 99/288 |
| 3,590,724 | 7/1971 | Lorang | 99/290 |
| 4,178,842 | 12/1979 | Vitous | 99/295 |
| 4,476,775 | 10/1984 | Daugherty | 99/295 |

*Primary Examiner*—Robert W. Jenkins
*Attorney, Agent, or Firm*—Lockwood, Alex, FitzGibbon & Cummings

[57] ABSTRACT

A combination beverage brewer and hot water dispenser having a hot water supply tank from which hot water may be selectively supplied to either a beverage brewing funnel or to a hot water tank equipped with a faucet. Cool or cold water may be introduced into the hot water supply tank to displace an equal volume of hot water and maintain the hot water supply tank in filled condition. Hot water can be drawn off through the faucet at the same time hot water is flowing from the hot water supply tank to the brewing funnel and without interfering with the brewing operation.

6 Claims, 6 Drawing Figures

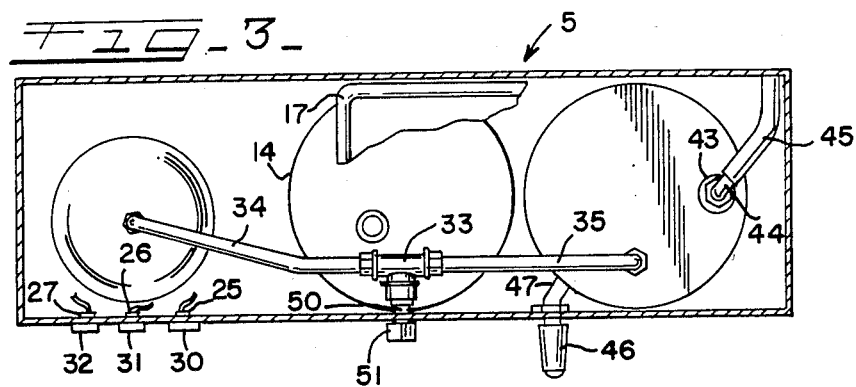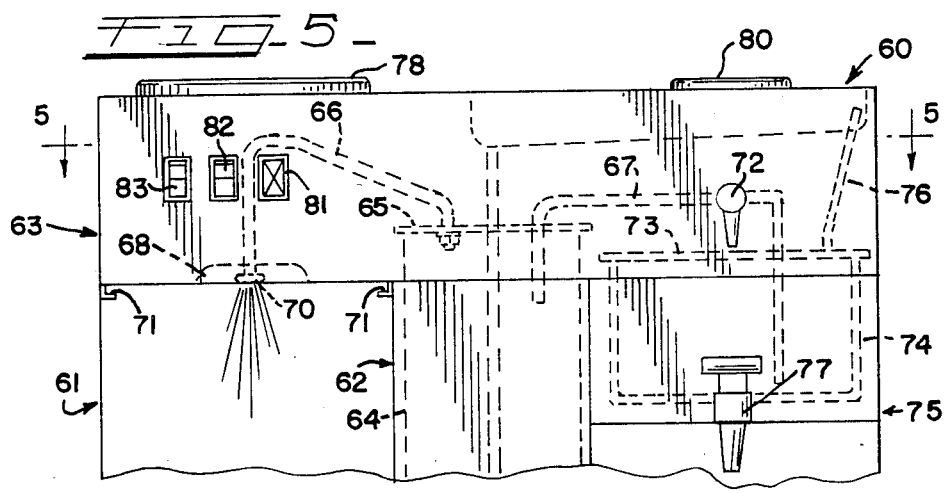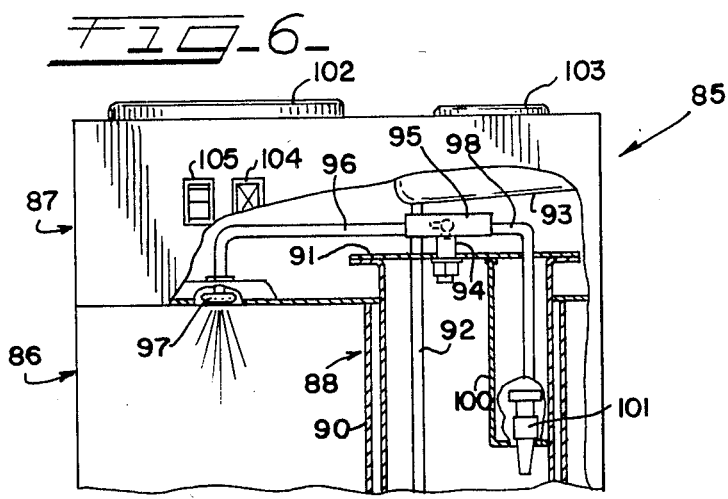

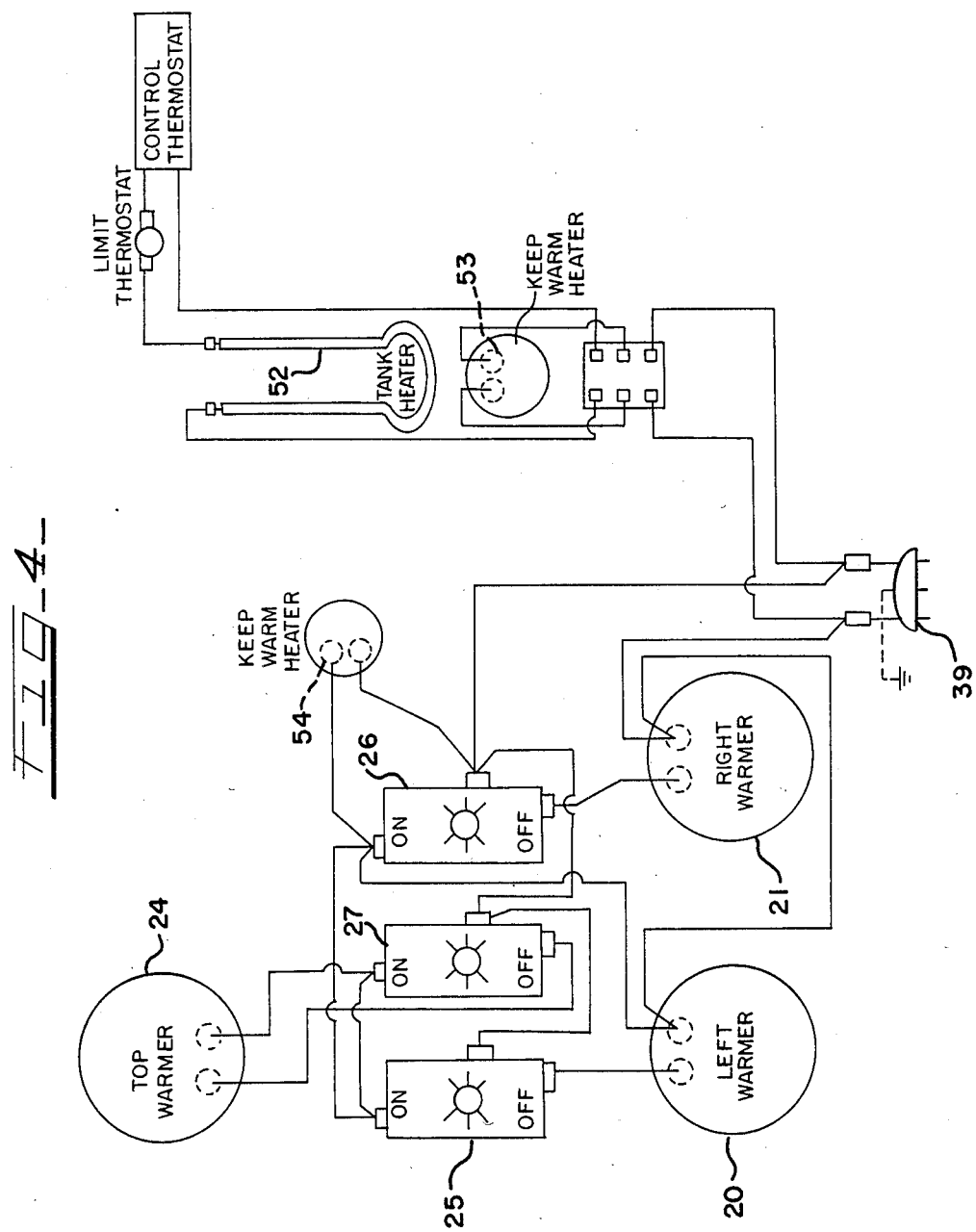

VPS WITH HOT WATER DISPENSER

This invention relates to a combination beverage brewer and hot water dispenser which provides in one machine or unit the ability to brew coffee or tea and, if desired, simultaneously dispense hot water without interfering with the brewing operation.

Beverage brewers are in widespread use by which batches of coffee may be brewed throughout working hours, for example, for consumption by persons having access thereto. However, in a single group of persons there will usually be at least one who does not want to consume the available brewed coffee but wants to have a supply of hot water available which can be used with powdered coffee, tea bags, cocoa or dried soup mix to prepare these beverages on an independent basis.

The object of the present invention, generally stated is that provision of a combination beverage brewer and hot water dispenser in the form of a single apparatus or machine which can be used on a selective basis to either brew a pot of coffee or tea or dispense hot water through a faucet, and, if desired to perform both operations simultaneously without one interfering with the other.

An important object of the invention is the provision of a combination beverage brewer and hot water dispenser wherein a supply of hot water is maintained in a hot water supply tank from which it can be displaced by introducing predetermined quantities of cool or cold water with the displaced hot water being selectively conducted either to a brewing funnel or to a separate hot water dispensing tank.

Certain other important objects of the invention will become apparent from the following description of three presently preferred embodiments of the invention taken in conjunction with the accompanying drawings, in which:

FIG. 3 is a horizontal sectional view taken on line 3—3 of FIG. 2;

FIG. 4 is a wiring diagram of the unit shown in FIGS. 1-3.

FIG. 5 is a fragmentary front elevational view of a combination beverage brewer and hot water dispenser forming a second embodiment of the invention; and FIG. 6 is a front elevational view partly broken away in vertical section showing a third embodiment of the invention.

Figure 1:
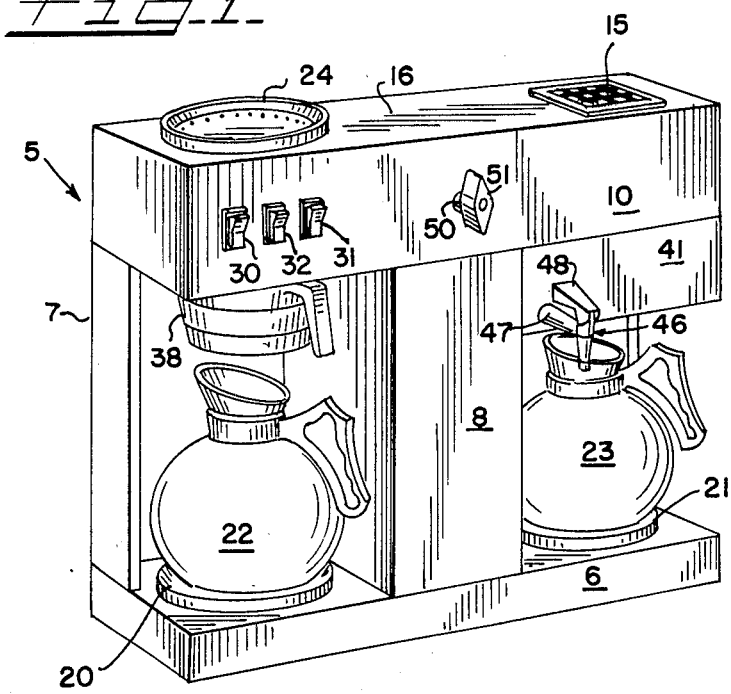
FIG. 1 is a perspective view of a combination beverage brewer and hot water dispenser forming one embodiment of the invention.
Figure 2:
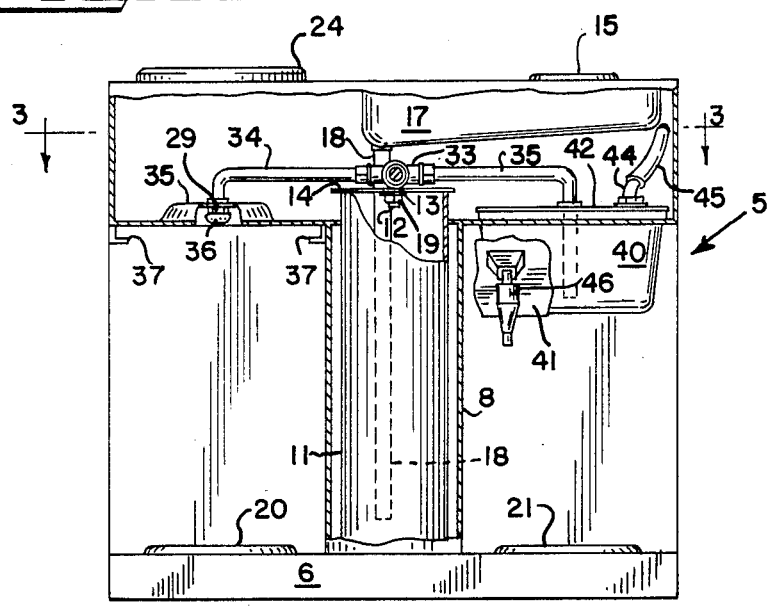
FIG. 2 is a front elevational view partly broken away and in vertical section of the unit shown in FIG. 1.

Referring to the embodiment shown in FIGS. 1-3, a combination beverage brewer and hot water dispenser is indicated therein generally at 5 which has a body structure formed by a base portion 6, a rear wall 7, an upstanding center leg 8 and a horizontal superstructure 10 supported on the tops of the rear wall 7 and upstanding leg 8. The base 6, rear wall 7, upstanding leg 8 and superstructure 10 are preferably fabricated from sheet metal and serve as housings for various components of the unit 5.

The upstanding leg 8 serves as a housing for a hot water supply tank 11 in which a supply of hot water is maintained normally up to the level of the bottom end 12 (FIG. 2) of a hot water outlet valve nipple 13 projecting through the cover 14 of the tank 11.

The beverage brewer portion of the unit 5 is of the so-called pour-in type wherein batches of cool or cold water are introduced through a screened opening 15 (FIG. 1) in the top wall 16 of the superstructure 10 underneath which is supported a cool or cold water basin 17 (FIG. 2 and 3). The bottom of the basin 17 is slanted downwardly as shown in FIG. 2 and the lowest portion thereof is provided with a drain opening from which depends the upper end of a fill tube 18. The fill tube 18 projects downwardly through the cover 14 of the hot water tank 11 and terminates adjacent the bottom of the hot water tank as shown in FIG. 2.

The base 6 is provided with heater plates 20 and 21 on which beverage beakers or carafes 22 and 23, respectively, may be supported. The superstructure 10 has one portion which is cantilevered over the warmer plate 20 and beaker 22 and another portion on the opposite side of the leg 8 which is cantilevered over the warmer 21 and beaker 23. Preferably the superstructure 10 is also provided with a warmer plate 24 on which a third beaker (not shown) may be maintained in the heated condition. Three on-off switches for the electrically heated warmer plates or discs 20, 21 and 24 are indicated in FIG. 3 at 25, 26 and 27 respectively. These switches are of known type and have operating buttons which project through the front wall of the superstructure 10 and are indicated 30, 31 and 32, respectively. Preferably the buttons 31, 32 and 33 are of the illuminated type so as to be illuminated when in the on position.

A three-position, three-port valve 33 of known type is mounted on the cover 14 of the hot water supply tank 11 and secured in place by a nut 19 on the nipple 13 tightened against the underside of the cover 14. The valve 33 is of known commercial type such for example as a three-way valve of the type used to select from which of two fuel tanks on a truck the engine will get its fuel. One such valve is designated commercially as an Anderson (ABC of Hartville, Inc.) part number SP2490-B3. The remaining two ports of the valve 33 extend laterally in opposite directions with one of these ports being connected with one end of a hot water tube 34 while the other port is connected with one end of a hot water tube 35. The outer or distal end of the water tube 34 is turned down at right angles and projects downwardly through the center of a circular raised portion 35 (FIG. 2) of the bottom panel of the housing 10. The bottom projecting end of the hot water tube 34 is threaded so as to receive thereon a retaining nut 29 and hot water sprayhead 36. On opposite sides of the sprayhead the underside of the superstructure 10 is provided with a pair of inturned rails 37—37 which serve to removably support the brewing funnel 38 (FIG. 1).

The outer or distal end of the hot water tube 35 is turned down at right angles and projects down through the inlet opening in the cover 42 of a hot water dispensing tank 40 which is disposed in outer housing 41 (FIG. 1) supported beneath the portion of the superstructure 10 which is cantilevered over the warming plate 21. The cover 42 for the hot water dispensing tank 40 is provided with an off-center opening 43 (FIG. 3) to which a elbow fitting 44 is connected having the upper end connected with one end of a flexible vent tube 45 which terminates in an opening in the rear wall of the superstructure 10 as shown in FIG. 3.

The hot water dispensing tank 40 is provided with a dispensing faucet 46 of known type having a nipple 47 which projects through the front wall of the housing 41 and is connected into hot water tank 40 adjacent the bottom thereof. The manipulating handle for the faucet 46 is indicated at 48.

As shown in FIGS. 1 and 3 the valve 33 has an operating spindle 50 which projects from the valve 33 outwardly through the front wall of the superstructure 10 and is provided with an operating knob or handle 51.

The construction of the apparatus 5 in respect to the beverage brewing components thereof, and the following described operation thereof, follow or correspond generally to the construction and operation of prior beverage or coffee brewing machines shown and described in the following patents and patent application assigned to the assignee of the present application: U.S. Pat. Nos. 3,220,334 Nov. 30, 1965; 3,336,856 Aug. 22, 1967; 3,385,201 May 28, 1968; 3,494,276 Feb. 10, 1970; 3,736,155 May 29, 1973; 4,413,552 Nov. 8, 1983; 4,476,775 Oct. 16, 1984; 4,478,139 Oct. 23, 1984 and Ser. No. 06/570,817 filed Jan. 16, 1984 allowed Oct. 1, 1984, now U.S. Pat. No. 4,503,757 dated Mar. 12, 1985.

Preferably, the unit 5 incorporates the structural and electrical features disclosed in co-pending application Ser. No. 06/570,817 which permit ready removal of the hot water supply tank 11 and associated components for servicing and replacement with a new or serviced replacement unit. In these respects, reference may be had to the wiring diagram in FIG. 4 and the disclosure of Ser. No. 06/570,817 which is incorporated by reference.

In start-up operation, with the brewing funnel 38 and beaker 22 in place the valve handle or knob 51 is first turned to the position which opens the port to which the hot water tube 34 is connected and then cool or cold water is introduced through the screened opening 15 into the basin 17. The cool or cold water flows by gravity downwardly through the cold water fill tube 18 and discharges into the hot water supply tank 11 and rises therein. Addition of cool or cold water is continued until water flows from the sprayhead 36 and out of the funnel 38 into the decanter 22 indicating that the hot water supply tank 11 has been filed with hot water. The plug 39 (FIG. 4) electrical connector cord for the unit 5 is then plugged into a energized outlet whereby the heating element 52 within the tank 11 is energized as is also the keep-warm blanket 53 surrounding the tank 11 and the keep-warm blanket 54 surrounding the hot water dispensing tank 40. These keep-warm blankets are desirable from the standpoint of energy efficiency and better operation but are not essential. The operating relationship between the heating element 52 for the hot water supply tank 11 and its keep-warm blanket 53 is described in the above-mentioned U.S. Pat. No. 3,736,115 dated May 29, 1973.

In a relatively short period (e.g. twenty minutes) the water within the supply tank 11 becomes heated to normal operating temperature. During this period some water will drip from the funnel 38 due to expansion of the water in the tank 11. Pour in several cups of cold water into the basin 17, allow a short time to pass (e.g. five minutes) after flow of water from the funnel 38 stops. Now turn the knob or handle 51 to close the port to line 34 and open the port to line 35 and pour in cold water in an amount equal to the capacity of the hot water dispensing tank 40. The unit 5 is now ready for use either for the brewing of coffee or tea or for the dispensing of hot water.

A suitable capacity for the hot water tank 40 is 64 ounces. Hot water may be drawn off at any time as desired by manipulating the faucet 46. When the hot water level within the tank 40 is lowered to the level of the faucet nipple 47 the flow of water will come slow and then discontinue, indicating to the user that the hot water tank 40 should be refilled.

When it is desired to brew coffee or tea, the brewing funnel 38 with a disposable paper filter therein is inserted on the rails 37 underneath a sprayhead 36 as shown in FIG. 1. The valve handle 51 is then turned to the position that opens the port leading to the hot water tube 34 and the desired amount of cool or cold water is introduced through the screened opening 15 into the basin 17. For example, if six cups of coffee are to be brewed then six cups of cold water are introduced into the basin 17. The cool or cold water displaces the corresponding amount of hot water from the upper end of the tank through the connection 13 and once the flow of hot water is started through the hot water tube 34 it continues until the level of the hot water in the supply tank 11 falls even with the bottom end 12 of the outlet connection 13 due to obvious siphoning action the sprayhead 36 being below the bottom end 12 of the inlet port of valve 33. Similarly, when the valve 33 is manipulated so that the port to hot water tube 34 is closed and the port to hot water tube 35 is open hot water will continue to flow through the hot water tube 35 by siphoning action until the level of hot water in the tank 11 becomes even with the bottom end 12.

It will be seen that as long as a supply of hot water remains in the hot water dispensing tank 40, hot water may be withdrawn therefrom without interfering with the simultaneous brewing of a batch of coffee or tea.

Referring to FIG. 5 of the drawings, a second embodiment of the invention is illustrated which embodies a number of the basic structural and operational features of the combination beverage brewer and hot water dispenser 5 shown and described in connection with FIGS. 1-4. In FIG. 5 a combination beverage brewer and hot water dispenser is indicated generally at 60 and comprises a base portion (not shown), a rear wall 61, an upstanding leg 62 and a superstructure 63 mounted on the tops of the back wall 61 and the leg 62. The upstanding leg 62 serves as a housing for a hot water supply tank 64 having a removable lid 65 from which projects a left hand hot water tube or conduit 66 and a right hand hot water tube or conduit 67. The hot water tube 66 rises upwardly on an incline to a point adjacent the top wall of the superstructure 63 and then turns downwardly so as to project through the raised circular panel section 68. The lower end of the hot water tube 66 which projects through the bottom wall of the superstructure 63 carries a sprayhead 70 from which hot water can be sprayed into a filter lined brewer funnel supported from the inwardly turned guide rails 71—71.

The hot water tube or conduit 67 is connected with the inlet port of a valve 72, the outlet port of which is connected with a section of the hot water tube 60 which turns downwardly and discharges through the lid or cover 73 of a hot water dispensing tank 74 mounted within a housing 75 supported underneath the bottom wall of the superstructure 63. A vent tube 76 is provided for the tank 74 with its upper end discharging through an opening in the rear wall of the superstructure 63. The hot water dispensing tank 74 is provided with a faucet 77 having a nipple which projects through the front wall of the housing 75 and into the tank 74.

The base unit 60 maybe provided with two warmer plates (not shown) which occupy the same relative position with respect to the sprayhead 70 and the faucet 77 as do the hot plates 20 and 21, respectively, of the unit 5. The unit 60 also has an upper warming plate 78 in the top wall of the superstructure 63 and also a screened pour-in opening 80. Three illuminated switches 81, 82 and 83 are provided for the three warming plates.

Assuming that both the hot water supply tank 64 and hot water dispensing tank 74 are filled with hot water and there is a requirement to prepare a batch of coffee or tea in the unit 60 with a brewing funnel having a filter and quantity of ground coffee or tea leaves in place therein inserted underneath the sprayhead 70, a batch of cool or cold water is poured in through the screened opening 80. With the valve 72 turned to the off position blocking flow through the hot water tube or conduit 67, it will be seen that the cool or cold water will displace an equal volume of hot water upwardly through the hot water tube 66. Once the flow has started the flow will continue until the siphoning action is interrupted when the level of the hot water within the tank 64 is lowered to the opening into the hot water tube 66. Hot water can be dispensed from the tank 74 at any time as long a supply remains therein, without regard as to whether or not a beverage is being brewed.

When the need arises to re-fill the hot water dispensing tank 77 with a supply of hot water, the valve 72 is opened and a quantity of cool or cold water poured into the unit 60 sufficient to refill the tank 74. The hot water from the hot water supply tank 64 that is displaced by the introduction of this cool or cold water will flow through the hot water tube 67 instead of through the hot water tube 66 since the elevated portion of the tube 66 offers a resistance to flow therein. When the hot water dispensing tank 64 has been refilled then the valve 72 is turned to the off position so that the unit 60 is again in condition for brewing a batch of coffee or tea in the manner described above.

A combined beverage brewer and hot water dispenser unit is designated generally at 85 in FIG. 6 which constitutes a third embodiment of the invention. As in the case of the unit 60 in FIG. 5, the unit 85 incorporates a number of the basic structural and operational features of the combination beverage brewer and hot water dispenser 5 described and shown in connection with FIGS. 1-4. The unit 85 will have a base portion (not shown) corresponding generally to the base 6 of unit 5 but with only one warmer and a rear wall 86, a superstructure 87 and an upstanding leg 88 which serves as a housing for a hot water supply tank 90.

The tank 90 carries a removable lid 91 through which projects the cold water fill tube 92 extending down from the drain opening in the cold water basin 93. In addition, a hot water discharge nipple 94 of a three-port valve 95 extends upwardly through the lid 91. The left hand port of the valve 95 is connected to a hot water tube or line 96 which extends to a sprayhead indicated at 97.

The right hand port of the valve 95 is connected to a right angle hot water fitting or tube 98 which extends downwardly through the lid 91 into a hot water dispensing reservoir or tank 100 disposed within the main hot water supply tank 90. The hot water dispensing tank 100 is provided with a faucet 101 which is mounted on the front exterior of the housing 88 with the nipple fitting thereof extending rearwardly through the wall of the tank 90 into the reservoir 100.

The unit 85 has two warming plates or discs with the upper one on the top of the superstructure 87 being designated at 102. Likewise there is a screened fill opening in the upper wall of the superstructure 87 as indicated at 103. Off-on switches for the two warming plates are mounted in the front wall of the superstructure 87 and designated at 104 and 105.

It will be appreciated that the unit 85 can be operated in substantially the same manner as the unit 5 of FIGS. 1-4.

It will be apparent that certain changes may be made in the units 5, 60 and 85 and other embodiments may be provided without departing from the spirit and scope of the invention. For example, the three-port valve 33 in FIG. 2 may be replaced with two separate check valves, one in line 34 and one in line 35. Likewise it will be apparent that the valves 33, 72 and 95 may be solenoid actuated instead of actuated manually.

Further, it will be apparent that the units 5, 60 and 85 instead of being of the cold or cool water pour-in type may be plumbed and thereby automatic. For example, they may be provided with automatically actuated means for introducing a batch of cool or cold water into a cold water basin as disclosed for example in U.S. Pat. Nos. 3,793,934, Feb. 26, 1974; 4,094,233, June 13, 1978; and 4,478,139, Oct. 23, 1984.

What is claimed is:

1. A combination beverage brewer and hot water dispenser, comprising:
   a body structure;
   a hot water supply tank supported by said body structure;
   means for periodically introducing cool or cold water into said hot water supply tank to displace hot water therefrom and maintain a supply of hot water therein;
   means for supporting a removable brewing funnel from an upper portion of said body structure above a beverage receptacle removably supported on a lower portion of said body structure;
   means for conducting hot water displaced from said hot water supply tank to said brewing funnel including a sprayhead supported on said body structure so as to discharge hot water into said brewing funnel and a first hot water tube communicating between the upper portion of said hot water supply tank and said sprayhead;
   a hot water dispensing tank supported by said body structure;
   a hot water dispensing faucet connected with said hot water dispensing tank for dispensing hot water therefrom;
   a second hot water tube in communication with the upper portion of said hot water supply tank and said hot water dispensing tank for conducting hot water displaced from said hot water supply tank to said hot water dispensing tank; and
   flow control means for selectively allowing hot water displaced from said hot water supply tank to flow in only a selected one of said first and second hot water tubes.

2. The combination beverage brewer and hot water dispenser called for in claim 1 wherein said flow control means is a three-port valve having one inlet port and two outlet ports, said inlet port having its inlet disposed within the top portion of said hot water supply tank and one of said outlet ports being connected with one of said hot water tubes and the remaining outlet port being connected with the remaining one of said hot water tubes.

3. The combination beverage brewer and hot water dispenser called for in claim 1 wherein to provide said flow control means said first hot water tube includes an intermediate section which rises substantially higher than any portion of said second hot water tube and, said second hot water tube includes a valve.

4. The combination beverage brewer and hot water dispenser called for in claim 1 wherein said hot water dispensing tank is housed within said hot water supply tank.

5. A combination beverage brewer and hot water dispenser, comprising:
- a body structure comprising a base, a leg upstanding from an intermediate portion of said base, and a superstructure mounted on said upstanding leg with a first portion cantilevered over said base on one side of said upstanding leg and a second portion cantilevered over said base on the side of said leg opposite said one side;
- a hot water supply tank disposed within said upstanding leg;
- means for periodically introducing cool or cold water into said hot water supply tank to displace hot water therefrom and maintain a supply of hot water therein;
- means for supporting a removable brewing funnel underneath said first cantilevered portion of said superstructure;
- first conduit means for conducting hot water from said hot water supply tank to said brewing funnel;
- a hot water dispensing tank supported underneath said second cantilevered portion of said superstructure;
- a hot water dispensing faucet mounted on said hot water dispensing tank;
- second conduit means for conducting hot water from said hot water supply tank to said hot water dispensing tank; and
- valve means in communication with at least one of said first and second conduit means for selectively preventing hot water from flowing simultaneously in said first and second conduit means.

6. A combination beverage brewer and hot water dispenser, comprising:
- a body structure comprising, a horizontal base, a rear wall upstanding from said base, a hot water supply tank housing upstanding from said base mid-way between its opposite ends, and an upper horizontal housing mounted on said rear wall and hot water supply tank housing with a first cantilevered portion thereof projecting over said base on one side of said hot water tank housing and a second cantilevered portion thereof projecting over said base on the opposite side of said hot water tank housing;
- a hot water supply tank disposed within said hot water supply tank housing;
- means for periodically introducing cool or cold water into said hot water supply tank to displace hot water therefrom and maintain a supply of hot water therein, including a fill tube having a discharge opening located in the lower portion of said tank;
- means for supporting a removable brewing funnel underneath said first cantilevered portion of said upper horizontal housing;
- means for conducting hot water displaced from the upper portion of said hot water supply tank to said brewing funnel including a sprayhead supported on said body structure so as to discharge hot water into said brewing funnel and a first hot water tube communicating between the upper portion of said hot water supply tank and said sprayhead;
- a hot water dispensing tank housing supported below said second cantilevered portion of said upper horizontal housing;
- a hot water dispensing tank disposed within said hot water dispensing tank housing;
- a hot water dispensing faucet connected with said hot water dispensing tank and projecting exteriorly from said hot water dispensing tank housing;
- a second hot water tube in communication with the upper portion of said hot water supply tank and said hot water dispensing tank for conducting hot water displaced from said hot water supply tank to said hot water dispensing tank; and flow control means including at least one valve for selectively preventing hot water from flowing in one of said first and second hot water tubes when hot water is flowing through the other.

* * * * *